US010208176B2

(12) United States Patent
Emmerson et al.

(10) Patent No.: US 10,208,176 B2
(45) Date of Patent: *Feb. 19, 2019

(54) COMPOSITE MATERIAL WITH THERMOPLASTIC TOUGHENED NOVOLAC-BASED EPOXY RESIN MATRIX

(71) Applicant: Hexcel Corporation, Dublin, CA (US)

(72) Inventors: Gordon Emmerson, Dublin, CA (US); Yen-Seine Wang, San Ramon, CA (US); Jessica Leandro, Freemont, CA (US)

(73) Assignee: HEXCEL CORPORATION, Dublin, CA (US)

(*) Notice: Subject to any disclaimer, the term of this patent is extended or adjusted under 35 U.S.C. 154(b) by 212 days.

This patent is subject to a terminal disclaimer.

(21) Appl. No.: 15/189,994

(22) Filed: Jun. 22, 2016

(65) Prior Publication Data
US 2017/0369662 A1    Dec. 28, 2017

(51) Int. Cl.
| | |
|---|---|
| *C08J 5/24* | (2006.01) |
| *B32B 27/38* | (2006.01) |
| *B32B 27/08* | (2006.01) |
| *B32B 27/20* | (2006.01) |
| *B64C 3/00* | (2006.01) |
| *B64C 5/02* | (2006.01) |
| *B64C 1/00* | (2006.01) |
| *B64C 27/473* | (2006.01) |

(52) U.S. Cl.
CPC ............... *C08J 5/24* (2013.01); *B32B 27/08* (2013.01); *B32B 27/20* (2013.01); *B32B 27/38* (2013.01); *B64C 3/00* (2013.01); *B64C 5/02* (2013.01); *B32B 2262/106* (2013.01); *B32B 2264/0214* (2013.01); *B32B 2264/0264* (2013.01); *B32B 2605/18* (2013.01); *B64C 2001/0072* (2013.01); *B64C 2027/4736* (2013.01); *C08J 2363/04* (2013.01); *C08J 2463/00* (2013.01); *C08J 2463/02* (2013.01); *C08J 2479/08* (2013.01); *C08J 2481/06* (2013.01)

(58) Field of Classification Search
CPC .................................. B32B 27/08; C08J 5/24
See application file for complete search history.

(56) References Cited

U.S. PATENT DOCUMENTS

| | | |
|---|---|---|
| 7,968,179 B2 | 6/2011 | Tilbrook et al. |
| 8,097,333 B2 | 1/2012 | Tilbrook et al. |
| 8,470,923 B2 | 6/2013 | Boyle et al. |
| 8,686,069 B2 | 4/2014 | Wang |

(Continued)

FOREIGN PATENT DOCUMENTS

WO        2014/011293        1/2014

*Primary Examiner* — Megan McCulley
(74) *Attorney, Agent, or Firm* — W. Mark Bielawski; David J. Oldenkamp

(57) ABSTRACT

Pre-impregnated composite material (prepreg) that can be cured/molded to form aerospace composite parts. The prepreg includes carbon reinforcing fibers and an uncured resin matrix. The resin matrix includes an epoxy component that is a combination of a hydrocarbon epoxy novolac resin and a trifunctional epoxy resin and a tetrafunctional epoxy resin. The resin matrix includes polyethersulfone as a toughening agent and a thermoplastic particle component that includes a mixture of polyamide particles and polyimide particles.

18 Claims, 1 Drawing Sheet

(56) References Cited

U.S. PATENT DOCUMENTS

| | | |
|---|---|---|
| 9,200,125 B2 | 12/2015 | Wang et al. |
| 2010/0108259 A1 | 5/2010 | Aspin |
| 2011/0143856 A1* | 6/2011 | Miwa ................... C08G 59/46 473/319 |
| 2011/0147670 A1* | 6/2011 | Tilbrook ............... C08G 59/38 252/503 |
| 2014/0058013 A1* | 2/2014 | Wang ..................... C08J 5/24 523/427 |
| 2014/0135443 A1 | 5/2014 | Aerts et al. |
| 2014/0163139 A1 | 6/2014 | Wang et al. |
| 2014/0170408 A1 | 6/2014 | Frulloni et al. |

\* cited by examiner

COMPOSITE MATERIAL WITH THERMOPLASTIC TOUGHENED NOVOLAC-BASED EPOXY RESIN MATRIX

BACKGROUND OF THE INVENTION

1. Field of the Invention

The present invention relates generally to pre-impregnated composite material (prepreg) that is used in making high performance composite parts that are especially well-suited for use as aerospace components. More particularly, the present invention is directed to novolac-based epoxy resins that are toughened with thermoplastic materials and used as the resin matrix in such prepreg.

2. Description of Related Art

Composite materials are typically composed of a resin matrix and reinforcing fibers as the two primary constituents. Composite materials are often required to perform in demanding environments, such as in the field of aerospace where the physical limits and characteristics of the composite part is of critical importance.

Pre-impregnated composite material (prepreg) is used widely in the manufacture of composite parts. Prepreg is a combination that typically includes uncured resin and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network affect the structural properties of the part.

Prepreg is a preferred material for use in manufacturing load-bearing or primary structural parts and particularly aerospace primary structural parts, such as wings, fuselages, bulkheads and control surfaces. It is important that these parts have sufficient strength, damage tolerance and other requirements that are routinely established for such parts.

The fiber reinforcements that are commonly used in aerospace prepreg are multidirectional woven fabrics or unidirectional tape that contains fibers extending parallel to each other. The fibers are typically in the form of a bundle of numerous individual fibers or filaments that is referred to as a "tow". The fibers or tows can also be chopped and randomly oriented in the resin to form a non-woven mat. These various fiber reinforcement configurations are combined with a carefully controlled amount of uncured resin. The resulting prepreg is typically placed between protective layers and rolled up for storage or transport to the manufacturing facility. Combinations of carbon fibers and an epoxy resin matrix have become a popular combination for aerospace prepreg.

Prepreg may also be in the form of short segments of chopped unidirectional tape that are randomly oriented to form a non-woven mat of chopped unidirectional tape. This type of prepreg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers. This material is commonly used as a sheet molding compound to form parts and molds for use in making parts.

The compression strength and tensile strength of a cured composite material is largely dictated by the individual properties of the reinforcing fiber and matrix resin, as well as the interaction between these two components. In addition, the fiber to resin volume ratio is an important factor. The compression and tensile strengths of a composite part are typically measured at room temperature under dry conditions. However, the compression strength and tensile strength are also routinely measured at elevated temperatures (e.g. 180° F.) under wet conditions. Many parts exhibit a significant drop in compression strength and/or tensile strength under such hot and wet conditions.

In many aerospace applications, it is desirable that the composite part exhibit high compression and/or tensile strength under both room temperature/dry conditions and hot/wet conditions. However, attempts to keep compression and tensile strengths constant under hotter/wetter conditions often results in negative effects on other desirable properties, such as damage tolerance and interlaminar fracture toughness.

Selecting higher modulus resins can be an effective way to increase the compression strength of a composite. However, this can result in a tendency to reduce damage tolerance, which is typically measured by a decrease in compressive properties, such as compression after impact (CAI) strength. Accordingly, it is can be difficult to achieve a simultaneous increase in both the compression and/or tensile strengths without deleteriously affecting the damage tolerance.

Multiple layers of prepreg are commonly used to form composite parts that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces.

One approach to increasing interlaminar fracture toughness for parts made from carbon fiber/epoxy resin prepreg has been to introduce thermoplastic sheets as interleaves between layers of prepreg. However, this approach tends to yield stiff, tack-free materials that are difficult to use. Another approach has been to add thermoplastic particles to the epoxy resin so that a resin interlayer containing the thermoplastic particles is formed between the fiber layers of the final part. Polyamides have been used as such thermoplastic particles. It also has been known to include a thermoplastic toughening agent in the epoxy resin. The toughening agent, such as polyether sulfone (PES) or polyetherimide (PEI), is dissolved in the epoxy resin before it is applied to the carbon fibers. Thermoplastic toughened epoxy resins, which include a combination of both thermoplastic toughening particles and a thermoplastic toughening agent, have been used in combination with carbon fiber to make aerospace prepreg.

The epoxy resin matrix may include one or more types of epoxy resin. It is known that various combinations of different types of epoxy resins may result in a wide variation in the properties of the final composite part. The curing agent used to cure the epoxy resin matrix can also substantially affect the properties of the final composite part. When formulating an epoxy resin for use as the resin matrix in aerospace prepreg, it is difficult to predict if a new combination of epoxy resin types and curatives will provide the desired combination of properties required for aerospace parts. This is especially the case when a thermoplastic toughening agent and thermoplastic particles form part of the epoxy resin formulation. Accordingly, there is a great deal of testing involved when one attempts to formulate new thermoplastic toughened epoxy resins in order to determine if the resin is suitable for use as resin matrix in aerospace prepreg.

Although existing aerospace prepregs are well suited for their intended use in providing composite parts that are strong and damage tolerant, there still is a continuing need to provide aerospace prepreg that may be used to make composite parts that exhibit desirable combinations of compression/tensile strength, damage tolerance and high interlaminar fracture toughness.

SUMMARY OF THE INVENTION

The pre-impregnated composite materials of the present invention are composed of carbon reinforcing fibers and an uncured resin matrix that includes a hydrocarbon novolac epoxy resin in combination with a trifunctional epoxy resin and a tetrafunctional epoxy resin. The uncured resin matrix further includes a thermoplastic particle component that is a mixture of polyimide particles and polyamide particles where the polyamide particles are composed of the polymeric condensation product of a methyl derivative of bis(4-aminocyclohexyl)methane and an aliphatic dicarboxylic acid. The uncured resin matrix includes polyethersulfone as a thermoplastic toughening agent and a curing agent.

The present invention also covers methods for making the prepreg and methods for molding the prepreg into a wide variety of composite parts. The invention also covers the composite parts that are made using the improved prepreg.

It has been found that resins having the formulation, as set forth above, can be used to form prepreg having an uncured resin matrix that may be molded to form composite parts that have unexpectedly high levels of interlaminar fracture toughness.

The above described and many other features and attendant advantages of the present invention will become better understood by reference to the following detailed description when taken in conjunction with the accompanying drawings.

DETAILED DESCRIPTION OF THE INVENTION

Uncured epoxy resin compositions in accordance with the present invention may be used in a wide variety of situations where a thermoplastic-toughened epoxy resin matrix is desired. Although the uncured epoxy resin composition may be used alone, the compositions are generally used as a matrix resin that is combined with a fibrous support to form composite material composed of the fibrous support and the resin matrix. The composite materials may be in the form of a prepreg, partially cured prepreg or a completely cured final part. The term "uncured", when used herein in connection with: prepreg; the resin before impregnation into the fibrous support; the resin matrix that is formed when the fibrous support is impregnated with the resin; or composite material, is intended to cover items that may have been subjected to some curing, but which have not been completely cured to form the final composite part or structure.

Although the uncured composite materials may be used for any intended purpose, they are preferably used in making parts for aerospace vehicles, such as commercial and military aircraft. For example, the uncured composite materials may be used to make non-primary (secondary) aircraft structures. However the preferred use of the uncured composite material is for structural applications, such as primary aircraft structures. Primary aircraft structures or parts are those elements of either fixed-wing or rotary wing aircraft that undergo significant stress during flight and which are essential for the aircraft to maintain controlled flight. The uncured composite materials may also be used for other structural applications to make load-bearing parts and structures in general.

Figure 1:
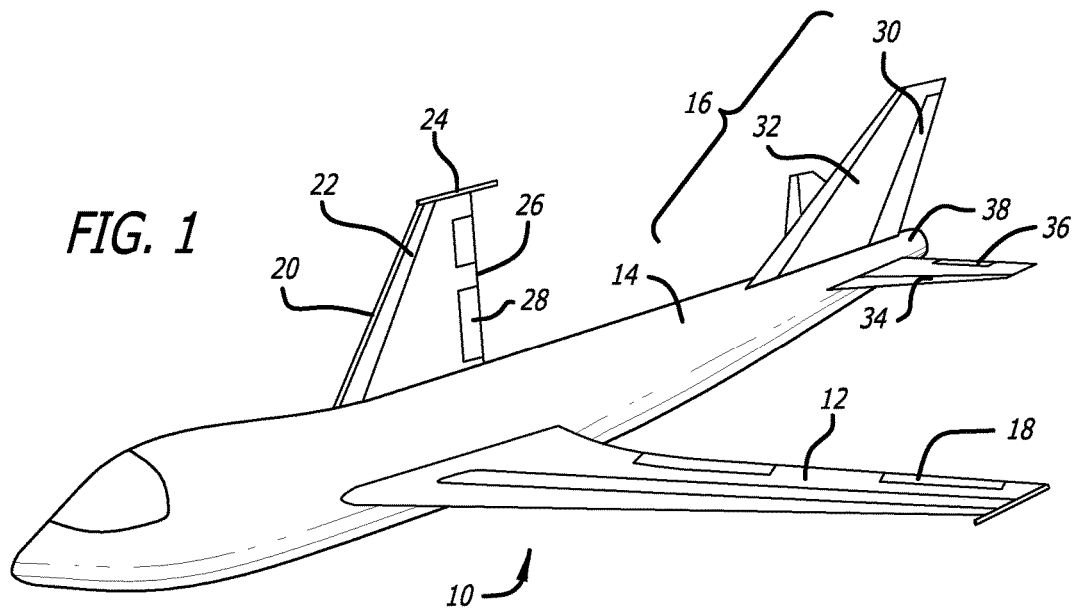
FIG. 1 is a perspective view of an aircraft, which depicts exemplary primary aircraft structures that can be made using composite materials in accordance with the present invention.
Figure 2:
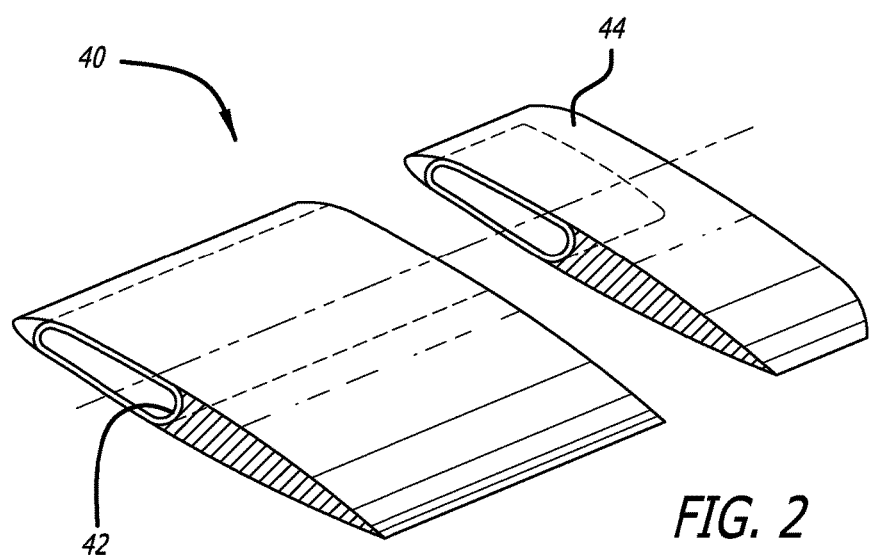
FIG. 2 is a partial view of a helicopter rotor blade, which depicts exemplary primary aircraft structures that can be made using composite materials in accordance with the present invention.

FIG. 1 depicts a fixed-wing aircraft at 10 that includes a number of exemplary primary aircraft structures and parts that may be made using uncured composite materials in accordance with the present invention. The exemplary primary parts or structures include the wing 12, fuselage 14 and tail assembly 16. The wing 12 includes a number of exemplary primary aircraft parts, such as ailerons 18, leading edge 20, wing slats 22, spoilers 24 trailing edge 26 and trailing edge flaps 28. The tail assembly 16 also includes a number of exemplary primary parts, such as rudder 30, fin 32, horizontal stabilizer 34, elevators 36 and tail 38. FIG. 2 depicts the outer end portions of a helicopter rotor blade 40 which includes a spar 42 and outer surface 44 as primary aircraft structures. Other exemplary primary aircraft structures include wing spars, and a variety of flanges, clips and connectors that connect primary parts together to form primary structures.

The pre-impregnated composite materials (prepreg) of the present invention may be used as a replacement for existing prepreg that is being used to form composite parts in the aerospace industry and in any other application where high structural strength and damage tolerance is required. The invention involves substituting the resin formulations of the present invention in place of existing resins that are being used to make prepreg. Accordingly, the resin formulations of the present invention are suitable for use as the matrix resin in conventional prepreg manufacturing and curing processes.

The pre-impregnated composite materials of the present invention are composed of reinforcing fibers and an uncured resin matrix. The reinforcing fibers can be any of the conventional fiber configurations that are used in the prepreg and composite sheet molding industry. Carbon fibers are preferred as the reinforcing fibers.

The resin used to form the resin matrix (matrix resin) includes a resin component that is made up of a hydrocarbon epoxy novolac resin in combination with a trifunctional epoxy resin and a tetrafunctional epoxy resin. The matrix resin further includes a thermoplastic particle component, a thermoplastic toughening agent and a curing agent.

The hydrocarbon epoxy novolac resin preferably has a dicyclopentadiene backbone and is available commercially from Huntsman Corporation (The Woodlands, Tex.) as TACTIX 556. This type of hydrocarbon novolac resin is referred to herein as a dicyclopentadiene novolac epoxy resin. The chemical formula for TACTIX 556 is

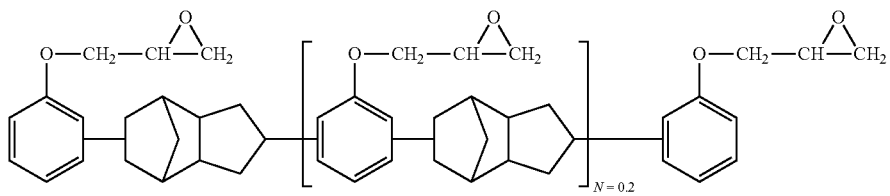

TACTIX 556 is an amber to dark colored semi-solid hydrocarbon epoxy novolac resin that has an epoxy index (ISO 3001) of 4.25 to 4.65 eq/kg and epoxy equivalent (ISO 3001) of 215-235 g/eq. The viscosity of TACTIX 556 at 79° C. (ISO 9371B) is 2250 mPa·s. Dicyclopentadiene epoxy novolac resins other than TACTIX 556 may be used in place of TACTIX 556 provided they have the same chemical formula and properties. For example, another suitable dicyclopentadiene epoxy novolac resin is XD-1000 which is available commercially from Nippon Kayaku Co., Ltd (Chiyoda-ku, Tokyo). TACTIX 556 is the preferred hydrocarbon epoxy novolac resin for use in accordance with the present invention.

The amount of hydrocarbon epoxy novolac resin present in the uncured resin may vary from 8 to 20 weight percent based on the total weight of the uncured resin matrix. Preferably, the uncured resin will contain from 10 to 17 weight percent dicyclopentadiene hydrocarbon epoxy novolac resin. Uncured resin formulations that contains from 13 to 15 weight percent dicyclopentadiene hydrocarbon epoxy novolac resin are particularly preferred because they provide an unexpectedly high G2c of about 13 when the ratio of polvamide particles to polyimide particles is from 3.2:1 to 2.8:1. The uncured resin must also include a trifunctional epoxy resin and a tetrafunctional epoxy resin.

A preferred exemplary trifunctional epoxy resin is triglycidyl para-aminophenol. Triglycidyl para-aminophenol is available commercially from Huntsman Advanced Materials (The Woodlands, Tex.) under the trade name Araldite MY0510. Another suitable trifunctional epoxy resin is triglycidyl meta-aminophenol. Triglycidyl meta-aminophenol is available commercially from Huntsman Advanced Materials (The Woodlands, Tex.) under the trade name Araldite MY0600 and from Sumitomo Chemical Co. (Osaka, Japan) under the trade name ELM-120. Other trifunctional epoxy resins may be used provided that they have properties that are the same or similar to the properties of triglycidyl para-aminophenol or triglycidyl meta-aminophenol.

An exemplary tetrafunctional epoxy resin is N,N,N',N'-tetraglycidyl-4,4'-diaminodiphenyl methane (TGDDM) which is available commercially as Araldite MY720 and MY721 from Huntsman Advanced Materials (The Woodlands, Tex.), or ELM 434 from Sumitomo Chemical Industries, Ltd. (Chuo, Tokyo). Other tetrafunctional epoxy resins may be used provided that they have properties that are the same or similar to the properties of N,N,N',N'-tetraglycidyl-4,4'-diaminodiphenyl methane.

The total amount of trifunctional and tetrafunctional epoxy resin may vary from 35 to 45 weight percent based on the total weight of the uncured resin. It is preferred that that the weight ratio between the trifunctional and tetrafunctional resins be from 1.0:1.5 to 1.5:1.0. It is particularly preferred that the weight ratio between the trifunctional and tetrafunctional resins be from 1.1:1.0 to 1.3:1.0.

The uncured matrix resin in accordance with the present invention also includes a thermoplastic particle component that is made up of polyimide particles and polyamide particles where the polyamide particles are composed of the polymeric condensation product of a methyl derivative of bis(4-aminocyclohexyl)methane and an aliphatic dicarboxylic acid.

Preferred polyimide particles are available commercially from HP Polymer GmbH (Lenzig, Austria) as P84 polyimide molding powder. Suitable polyamide particles are also available commercially from Evonik Industries (Austria) under the tradename P84NT. The polyimide used to make the particles is disclosed in U.S. Pat. No. 3,708,458, the contents of which is hereby incorporated by reference. The polyimide is made by combining benzophenone-3,3',4,4'-tetracarboxylic acid dianhydride with a mixture of 4,4'-methylenebis (phenyl isocyanate) and toluene diisocyanate (2,4- or 2,6-isomer). The amine analogs may be used in place of the aromatic iso- and diisocyanates. The CAS Registry No. of the polyimide is 58698-66-1.

The polyimide particles are composed of an aromatic polyimide having the repeating monomer formula:

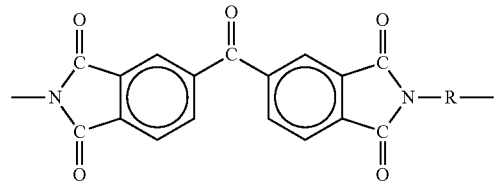

where from 10 to 90% of the R groups in the overall polymer are an aromatic group having the formula:

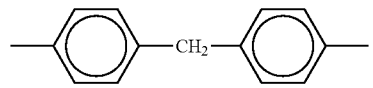

with the remaining R groups in the polymer being

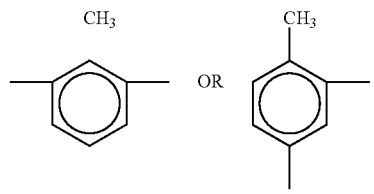

The size of the polyimide particles in the powder typically ranges from 2 microns to 35 microns. A preferred polyimide powder will contain particles that range in size from 2 to 30 microns with the average particle size ranging from 5 microns to 15 microns. Preferably, at least 90 weight percent of the polyimide particles in the powder will be in the size range of 2 microns to 20 microns. The polyimide particles may be regular or irregular in shape. For example, the particles may be substantially spherical or they can be particles with a jagged shape.

The polyimide particles contain at least 95 weight percent polyimide. Small amounts (up to 5 weight percent) of other materials may be included in the particles provided that they do not adversely affect the overall characteristics of the particles.

The glass transition temperature (Tg) of the polyimide particles should be about 330° C. with the density of individual particles being 1.34 grams per cubic centimeter. The linear coefficient of thermal expansion of the particles is 50.

The polyamide particles are formed from the polymeric condensation product of a methyl derivative of bis(4-aminocyclohexyl)methane and an aliphatic dicarboxylic acid selected from the group consisting of decane dicarboxylic acid and dodecane dicarboxylic acid. Methyl derivatives of bis(4-aminocyclohexyl)methane, which are referred to herein as the "amine component" are also known as methyl derivatives of 4,4'-diaminocyclohexylmethane. This type of polyamide particle and the methods for making them are described in detail in U.S. Pat. Nos. 3,936,426 and 5,696,202, the contents of which are hereby incorporated by reference.

The formula for the amine component of the polymeric condensation product is

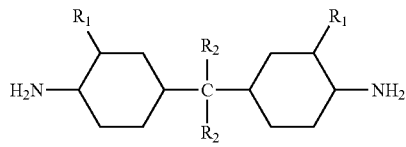

where $R_2$ is hydrogen and $R_1$ is methyl.

The polyamide particles are made from the polymeric condensation product of 3,3'-dimethyl-bis(4-aminocyclohexyl)-methane ($R_1$ both are methyl and $R_2$ both are hydrogen) and 1,10-decane dicarboxylic acid. The polyamide particles are made by combining, in a heated receiving vessel, 13,800 grams of 1,10-decane dicarboxylic acid and 12,870 grams of 3,3'-dimethyl-bis(4-aminocyclohexyl)methane with 30 grams of 50% aqueous phosphoric acid, 150 grams benzoic acid and 101 grams of water. The mixture is stirred in a pressure autoclave until homogeneous. After a compression, decompression and degassing phase, the polyamide condensation product is pressed out as a strand, passed under cold water and granulated to form the polyamide particles. The polyamide particles can also be made from GRILAMID TR90, which is commercially available from EMS-Chime (Sumter, S.C.). GRILAMID TR90 is the polymeric condensation product of 3,3'-dimethyl-bis(4-aminocyclohexyl)-methane and 1,10-decane dicarboxylic acid.

The formula for the monomeric unit of the polymeric condensation product may be represented as follows:

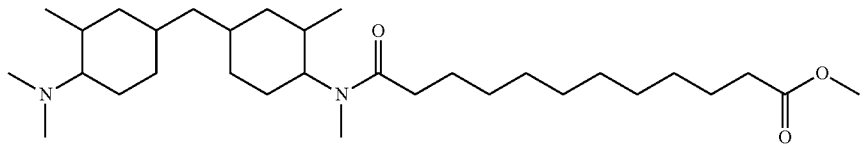

The molecular number of the polymeric condensation product will range from 14,000 to 20,000 with a molecular numbers of about 17,000 being preferred.

The polyamide particles should have particle sizes of below 100 microns. It is preferred that the particles range in size from 5 to 60 microns and more preferably from 10 to 30 microns. It is preferred that the average particle size is from 15 to 25 microns. The polyamide particles may be regular or irregular in shape. For example, the particles may be substantially spherical or they can be particles with a jagged shape.

The total amount of thermoplastic particles in the uncured resin may vary from 9 to 15 weight percent based on the total weight of the uncured resin. In order to obtain high resistance to delamination, the weight ratio between the polyimide particles and the polyimide particles can range from 3.5:1.0 to 1.0:1.0.Preferably, the weight ratio between the polyamide particles and polyimide particles is between 3.2:1.0 and 2.8:1.0. In a particularly preferred embodiment, the amount of polyamide particles is from 8 to 10 weight percent of the total weight of the uncured resin and the amount of polyimide particles is from 2 to 4 weight percent of the total weight of the uncured resin.

The prepreg matrix resin includes at least one curing agent which preferably is 3,3'-diamine-diphenylsulfone (3,3'-DDS) or 4,4'-diamine-diphenylsulfone (4,4'-DDS). These two curing agents may be used alone or in combination. Both 3,3'-DDS and 4,4'-DDS are commercially available from Huntsman Advanced Materials (Brewster, N.Y.). 3,3'-DDS is particularly preferred as the curing agent.

The curing agent is present in an amount that ranges from 15 wt % to 30 wt % of the uncured resin. Preferably, the curing agent is present in an amount that ranges from 20 wt % to 30 wt %. When 3,3'-DDS is used as the curing agent, the preferred amount is from 24 to 28 weight percent based on the total weight of the uncured resin.

The uncured matrix resin of the present invention also includes polyethersulfone as a thermoplastic toughening agent. The polyethersulfone is added to the resin mix as particles that are dissolved in the resin mixture by heating prior to addition of the curing agent. Once the thermoplastic toughening agent is substantially dissolved in the hot resin precursor (i.e. the blend of epoxy resins), the precursor is cooled and the remaining ingredients (curing agent and insoluble thermoplastic particles) are added and mixed with the cooled resin blend.

Particulate polyethersulfone (PES) is sold under the trade name Sumikaexcel 5003P, which is commercially available from Sumitomo Chemicals (New York, N.Y.). Alternatives to 5003P are Solvay polyethersulphone 105RP, or the non-hydroxyl terminated grades such as Solvay 1054P which is commercially available from Solvay Chemicals (Houston, Tex.). Densified PES particles may be used as the toughening agent. The form of the PES is not particularly important since the PES is dissolved during formation of the resin. Densified PES particles can be made in accordance with the teachings of U.S. Pat. No. 4,945,154, the contents of which are hereby incorporated by reference. Densified PES particles are also available commercially from Hexcel Corporation (Dublin, Calif.) under the trade name HRI-1. The average particle size of the toughening agent should be less than 100 microns to promote and insure complete dissolution of the PES in the matrix.

The PES toughening agent is present in the range 5 wt % to 26 wt %, based on the total weight of the uncured resin. Preferably, the toughening agent is present in the range 7 wt % to 14 wt %. The preferred amount of PES for use in making resins with relatively low minimum viscosity (25-45 Poise) is from 7 to 9 weight percent based on the total weight of the uncured resin. The preferred amount of PES for use in making resins with relatively high minimum viscosity (55-75 Poise) is from 10 to 13 weight percent based on the total weight of the uncured resin.

The matrix resin may also include additional ingredients, such as performance enhancing or modifying agents provided they do not adversely affect the tack and out-life of the prepreg or the strength and damage tolerance of the cured composite part. The performance enhancing or modifying agents, for example, may be selected from core shell rubbers, flame retardants, wetting agents, pigments/dyes, UV absorbers, anti-fungal compounds, fillers, conducting particles, and viscosity modifiers.

Suitable fillers include, by way of example, any of the following either alone or in combination: silica, alumina, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon nanotubes and carbon nanofibres. Metal-coated fillers may also be used, for example nickel coated carbon particles and silver coated copper particles.

The uncured resin is made in accordance with standard prepreg matrix resin processing. In general, the hydrocarbon novolac epoxy resin and other epoxy resin(s) are mixed together at room temperature to form a resin mix to which the thermoplastic toughening agent is added. This mixture is then heated to about 120° C. for about 1 to 2 hours to dissolve the thermoplastic toughening agent. The mixture is then cooled down to about 80° C. and the remainder of the ingredients (thermoplastic particle component, curing agent and other additive, if any) is mixed into the resin to form the final uncured resin matrix that is impregnated into the fiber reinforcement.

The uncured resin is applied to the fibrous reinforcement to form an uncured resin matrix in accordance with any of the known prepreg manufacturing techniques. The fibrous reinforcement may be fully or partially impregnated with the uncured resin. In an alternate embodiment, the uncured resin may be applied to the fiber fibrous reinforcement as a separate layer, which is proximal to, and in contact with, the fibrous reinforcement, but does not substantially impregnate the fibrous reinforcement. The prepreg, which is also referred to as semi-preg, is typically covered on both sides with a protective film and rolled up for storage and shipment at temperatures that are typically kept well below room temperature to avoid premature curing. The actual resin matrix is not formed until further processing of the semi-preg. Any of the other prepreg manufacturing processes and storage/shipping systems may be used if desired.

The fibrous reinforcement of the prepreg may be selected from any fiberglass, carbon or aramid (aromatic polyamide) fibers. The fibrous reinforcement is preferably carbon fibers. Preferred carbon fibers are in the form of tows that contain from 3,000 to 15,000 carbon filaments (3K to 15K). Commercially available carbon fiber tows that contain 6,000 or 12,000 carbon filaments (6K or 12K) are preferred.

Particularly preferred are IM8GP and IM7 carbon fibers which are commercially available from Hexcel Corporation (Dublin, Calif.). IM7 12K fibers have a tensile strength of 820 ksi, the tensile modulus is 40 Msi, the strain at failure is 1.9%, the density is 1.78 g/cm$^3$ and the weight per length is 0.45 g/m. IM7 6K fibers have a tensile strength of 800 ksi, the tensile modulus is 40 Msi, the strain at failure is 1.9%, the density is 1.78 g/cm$^3$ and the weight per length is 0.22 g/m.

The fibrous reinforcement may comprise cracked (i.e. stretch-broken) or selectively discontinuous fibers, or continuous fibers. The use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg that is used to form sheet molding compound. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Les Avenieres, France).

The prepreg may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

The following exemplary preferred resin formulations may be impregnated into a fibrous support to form a resin matrix in accordance with the present invention (all weight percentages are based on the total resin weight):

1) 9 wt % to 11 wt % dicyclopentadiene novolac epoxy resin (TACTIX®556); 21 wt % to 23 wt % triglycidyl-p-aminophenol (MY0510); 17 wt % to 19 wt % tetrafunctional epoxy (MY721); 10 wt % to 13 wt % polyethersulfone (5003P); 8 wt % to 10 wt % polyimide particles (P84HCM); 2 wt % to 4 wt % particles made from the condensation product of 3,3'-dimethyl-bis(4-aminocyclohexyl)-methane and 1,10-decane dicarboxylic acid (GRILAMID TR90); and 25 wt % to 28 wt % 3,3'-DDS as the curing agent.

2) 13 wt % to 16 wt % dicyclopentadiene novolac epoxy resin (TACTIX® 556); 18 wt % to 20 wt % triglycidyl-p-aminophenol (MY0510); 17 wt % to 19 wt % tetrafunctional epoxy (MY721); 10 wt/o to 13 wt % polyethersulfone (5003P); 8 wt % to 10 wt % polyimide particles (P84HCM); 2 wt % to 4 wt % particles made from the condensation product of 3,3'-dimethyl-bis(4-aminocyclohexyl)-methane and 1,10-decane dicarboxylic acid (GRILAMID TR90); and 25 wt % to 28 wt % 3,3'-DDS as the curing agent.

3) 16 wt % to 18 wt % dicyclopentadiene novolac epoxy resin (TACTIX®556); 14 wt % to 16 wt % triglycidyl-p-aminophenol (MY0510); 17 wt % to 19 wt % tetrafunctional epoxy (MY721); 10 wt % to 13 wt % polyethersulfone (5003P); 5 wt % to 7 wt % polyimide particles (P84HCM); 5 wt % to 7 wt % particles made from the condensation product of 3,3'-dimethyl-bis(4-aminocyclohexyl)-methane and 1,10-decane dicarboxylic acid (GRILAMID TR90); and 25 wt % to 28 wt % 3,3'-DDS as the curing agent.

4) 13 wt % to 16 wt % dicyclopentadiene novolac epoxy resin (TACTIX®556); 19 wt % to 21 wt % triglycidyl-p-aminophenol (MY0510); 18 wt % to 20 wt %6 tetrafunctional epoxy (MY721); 7 wt % to 9 wt % polyethersulfone (5003P); 2 wt % to 4 wt % polyimide particles (P84HCM); 8 wt % to 10 wt % particles made from the condensation product of 3,3'-dimethyl-bis(4-aminocyclohexyl)-methane and 1,10-decane dicarboxylic acid (GRILAMID TR90); and 25 wt % to 28 wt % 3,3'-DDS as the curing agent.

5) 9 to 11 wt % dicyclopentadiene novolac epoxy resin (TACTIX® 556); 21 wt % to 23 wt % triglycidyl-p-aminophenol (MY0510); 19 wt % to 22 wt % tetrafunctional epoxy (MY721); 7 wt % to 9 wt % polyethersulfone (5003P); 2 wt % to 4 wt % polyimide particles (P84HCM); 8 wt % to 10 wt % particles made from the condensation product of 3,3'-dimethyl-bis(4-aminocyclohexyl)-methane and 1,10-decane dicarboxylic acid (GRILAMID TR90); and 26 wt %6 to 29 wt % 3,3'-DDS as the curing agent.

The prepreg may be molded using any of the standard techniques used to form composite parts. Typically, one or more layers of prepreg are placed in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The composite material may be cured using a method selected from microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful in many other high performance composite applications including automotive, rail and marine applications where high compressive strength, interlaminar fracture toughness and resistance to impact damage are needed.

Examples of Practice are as Follows

EXAMPLE 1

A preferred exemplary resin formulation in accordance with the present invention is set forth in TABLE 1. A matrix resin was prepared by mixing the epoxy ingredients at room temperature with the polyethersulfone to form a resin blend that was heated to 120° C. for 60 minutes to completely dissolve the polyethersulfone. The mixture was cooled to 80° C. and the rest of the ingredients added and mixed in thoroughly.

TABLE 1

| Ingredient | Amount (Wt %) |
| --- | --- |
| Hydrocarbon epoxy novolac resin (TACTIX ®556) | 10.0 |
| Trifunctional para-glycidyl amine (MY0510) | 21.9 |
| N,N,N',N',-tetraglycidyl-4,4'-diaminodiphenyl methane (MY721) | 18.2 |
| Thermoplastic Toughening Agent (polyether sulfone-5003P) | 11.5 |
| Polyimide Particles (P84HCM) | 3.0 |
| Polyamide Particle (TR90) | 9.0 |
| Aromatic diamine curing agent (3,3-DDS) | 26.4 |

Exemplary prepreg was prepared by impregnating one or more layers of unidirectional carbon fibers with the resin formulation of TABLE 1. The unidirectional carbon fibers (12K IM8GP available from Hexcel Corporation) were used to make a prepreg in which the matrix resin amounted to 35 weight percent of the total uncured prepreg weight and the fiber areal weight was 192 grams per square meter (gsm). 26-ply laminates were prepared using standard prepreg fabrication procedures. The laminates were cured in an autoclave at 177° C. for about 2 hours. The cured laminates were tested to determine interlaminar fracture toughness.

G2c is a standard test that provides a measure of the interlaminar fracture toughness of a cured laminate. G2c was determined as follows. A 26-ply unidirectional laminate was cured with a 3 inch fluoroethylene polymer (FEP) film inserted along one edge, at the mid-plane of the layup, perpendicular to the fiber direction to act as a crack starter. The laminate was cured for 2 hours at 177° C. in an autoclave and gave a nominal thickness of 3.8 mm. Consolidation was verified by C-scan. G2c samples were machined from the cured laminate. G2c was tested at room temperature in accordance with BSS7320. The G2c values listed below are the average of the first and second cracks observed during the testing in accordance with BSS7320.

The G2c of the cured 26-ply laminate was 10.22. Open hole compression (OHT) and open hole compression (OHC) were also measured according to standard procedures at room temperature and found to be above acceptable limits for structural parts.

EXAMPLE 2

An exemplary prepreg having a second preferred resin matrix with the formula set forth in TABLE 2 was prepared in the same manner as Example 1.

TABLE 2

| Ingredient | Amount (Wt %) |
| --- | --- |
| Hydrocarbon epoxy novolac resin (TACTIX ®556) | 14.10 |
| Trifunctional para-glycidyl amine (MY0510) | 19.15 |
| N,N,N',N'-tetraglycidyl-4,4'-diaminodiphenyl methane (MY721) | 17.85 |
| Thermoplastic Toughening Agent (polyether sulfone-5003P) | 11.50 |
| Polyimide Particles (P84HCM) | 3.0 |
| Polyamide Particle (TR90) | 9.0 |
| Aromatic diamine curing agent (3,3-DDS) | 25.40 |

26-ply laminates were prepared, cured and tested for G2c at room temperature in the same manner as Example 1. The G2c was 13.16. The OHT and OHC were both also above acceptable limits for structural parts.

EXAMPLE 3

An exemplary prepreg was prepared in the same manner as Example 1, except that a third preferred resin formulation, as set forth in TABLE 3, was used as the prepreg resin matrix.

TABLE 3

| Ingredient | Amount (Wt %) |
| --- | --- |
| Hydrocarbon epoxy novolac resin (TACTIX ®556) | 17.0 |
| Trifunctional para-glycidyl amine (MY0510) | 14.9 |
| N,N,N',N'-tetraglycidyl-4,4'-diaminodiphenyl methane (MY721) | 18.2 |
| Thermoplastic Toughening Agent (polyether sulfone-5003P) | 11.5 |
| Polyimide Particles (P84HCM) | 6.0 |
| Polyamide Particle (TR90) | 6.0 |
| Aromatic diamine curing agent (3,3-DDS) | 26.4 |

26-ply laminates were prepared, cured and tested for G2c at room temperature in the same manner as Example 1. The G2c was 10.47. The OHT and OHC were both also above acceptable limits for structural parts.

EXAMPLE 4

An exemplary prepreg was prepared in the same manner as Example 1, except that a resin formulation in accordance with the present invention, as set forth in TABLE 4, was used as the prepreg resin matrix.

TABLE 4

| Ingredient | Amount (Wt %) |
| --- | --- |
| Hydrocarbon epoxy novolac resin (TACTIX ®556) | 17.0 |
| Trifunctional meta-glycidyl amine (MY0610) | 14.9 |
| N,N,N',N'-tetraglycidyl-4,4'-diaminodiphenyl methane (MY721) | 18.2 |
| Thermoplastic Toughening Agent (polyether sulfone-5003P) | 11.5 |
| Polyimide Particles (P84HCM) | 6.0 |
| Polyamide Particle (TR90) | 6.0 |
| Aromatic diamine curing agent (3,3-DDS) | 26.4 |

26-ply laminates were prepared, cured and tested for G2c at room temperature in the same manner as Example 1. The G2c was 9.15. The OHT and OHC were both also above acceptable limits for structural parts.

EXAMPLE 5

An exemplary prepreg was prepared in the same manner as Example 1, except that a resin formulation in accordance with the present invention, as set forth in TABLE 5, was used as the prepreg resin matrix.

TABLE 5

| Ingredient | Amount (Wt %) |
| --- | --- |
| Hydrocarbon epoxy novolac resin (TACTIX ®556) | 10.0 |
| Trifunctional para-glycidyl amine (MY0510) | 21.9 |
| N,N,N',N'-tetraglycidyl-4,4'-diaminodiphenyl methane (MY721) | 18.2 |
| Thermoplastic Toughening Agent (polyether sulfone-5003P) | 11.5 |
| Polyimide Particles (P84HCM) | 6.0 |
| Polyamide Particle (TR90) | 6.0 |
| Aromatic diamine curing agent (3,3-DDS) | 26.4 |

26-ply laminates were prepared, cured and tested for G2c at room temperature in the same manner as Example 1. The G2c was 9.50. The OHT and OHC were both also above acceptable limits for structural parts.

EXAMPLE 6

An exemplary prepreg was prepared in the same manner as Example 1, except that a resin formulation in accordance with the present invention, as set forth in TABLE 6, was used as the prepreg resin matrix.

TABLE 6

| Ingredient | Amount (Wt %) |
| --- | --- |
| Hydrocarbon epoxy novolac resin (TACTIX ®556) | 14.75 |
| Trifunctional para-glycidyl amine (MY0510) | 20.03 |
| N,N,N',N'-tetraglycidyl-4,4'-diaminodiphenyl methane (MY721) | 18.67 |
| Thermoplastic Toughening Agent (polyether sulfone-5003P) | 8.0 |
| Polyimide Particles (P84HCM) | 3.0 |
| Polyamide Particle (TR90) | 9.0 |
| Aromatic diamine curing agent (3,3-DDS) | 26.56 |

26-ply laminates were prepared, cured and tested for G2c at room temperature in the same manner as Example 1. The G2c was 9.31. The OHT and OHC were both also above acceptable limits for structural parts.

EXAMPLE 7

An exemplary prepreg was prepared in the same manner as Example 1, except that a resin formulation in accordance with the present invention, as set forth in TABLE 7, was used as the prepreg resin matrix.

TABLE 7

| Ingredient | Amount (Wt %) |
| --- | --- |
| Hydrocarbon epoxy novolac resin (TACTIX ®556) | 10.0 |
| Trifunctional para-glycidyl amine (MY0510) | 22.0 |
| N,N,N',N'-tetraglycidyl-4,4'-diaminodiphenyl methane (MY721) | 20.5 |
| Thermoplastic Toughening Agent (polyether sulfone-5003P) | 8.0 |
| Polyimide Particles (P84HCM) | 3.0 |
| Polyamide Particle (TR90) | 9.0 |
| Aromatic diamine curing agent (3,3-DDS) | 27.5 |

26-ply laminates were prepared, cured and tested for G2c at room temperature in the same manner as Example 1. The G2c was 7.30. The OHT and OHC were both also above acceptable limits for structural parts.

COMPARATIVE EXAMPLES 1-7

Comparative prepregs and laminates were prepared, cured and tested in the same manner as Example 1, except that the resin formulations were as set forth in TABLE 8. The amounts listed in TABLE 8 are weight percent of the total resin mixture. 26-ply laminates were prepared, cured and tested for G2c at room temperature in the same manner as Example 1. The G2c results are listed in the table.

TABLE 8

| Ingredient | C1 | C2 | C3 | C4 | C5 | C6 | C7 |
|---|---|---|---|---|---|---|---|
| TACTIX ®556 | 10.0 | 10.0 | 14.1 | 10.0 | 5.00 | 14.75 | 5.00 |
| MY0510 | 21.9 | 21.9 | 19.16 | 22.00 | 24.08 | 20.03 | 24.08 |
| MY721 | 18.2 | 18.2 | 17.89 | 20.50 | 22.44 | 18.67 | 22.44 |
| 5003P | 11.5 | 11.5 | 11.5 | 8.0 | 8.0 | 8.0 | 8.0 |
| P84HCM | 12.0 | 0 | 9.0 | 0 | 3.0 | 0 | 0 |
| TR90 | 0 | 12.0 | 3.0 | 12.0 | 9.0 | 12.0 | 12.0 |
| 3,3-DDS | 26.4 | 26.4 | 25.4 | 27.51 | 28.49 | 26.56 | 28.49 |
| G2c | 4.68 | 9.97 | 7.12 | 5.31 | 4.29 | 8.36 | 2.64 |

The viscosity of the resin formulation should be such that the prepreg resin formulation can be suitably impregnated or otherwise applied to the fibrous reinforcement using accepted prepreg formation processes. The viscosity profile of the resin provides a guide as to the suitability of a resin formulation for use as a prepreg resin. The viscosity profile is determined by raising the temperature of the resin from room temperature at a rate of 2° C. per minute and monitoring the viscosity of the resin. As the resin is heated, the viscosity typically decreases to a minimum and then increases as polymerization progresses. The minimum viscosity of the resin and the temperature at which this minimum viscosity is reached provides an indication of the suitability of the resin for a given prepreg process. When the term "minimum viscosity" is used herein, it means the minimum viscosity that is measured during determination of the viscosity profile for the resin.

In many prepreg manufacturing processes, it is desirable that the minimum viscosity be such that adequate resin flow occurs during formation of the prepreg to ensure complete impregnation of the fiber reinforcement. The desired minimum viscosity for the prepreg resin in such processes depends upon a number of factors including the desired degree of impregnation, impregnation temperature and pressure, the method used to accomplish impregnation and the type of fibrous reinforcement.

In accordance with the present invention, the preferred minimum viscosity of the prepreg resin is in the range of from 55 to 75 Poise (P) for those prepreg processes that require a relatively high viscosity prepreg resin. For prepreg processes that require a relatively low viscosity prepreg resin, the preferred minimum viscosity of the prepreg resin is in the range of from 25 to 45 P. It was found that amounts of PES in the range of 10-13 weight percent provides prepreg resins in accordance with the present invention that are in the higher minimum viscosity range. PES amounts in the range of 7-9 weight percent provide prepreg resins in accordance with the present invention that are in the lower minimum viscosity range.

The viscosity profiles were determined for Examples 1-7 and Comparative Examples 1-7. The minimum viscosity and temperature at which the minimum viscosity was reached is set forth in TABLE 9. The amount of PES and TACTIX 556 resin in the formulation along with the G2c values are also tabulated in the table.

TABLE 9

| | Minimum Viscosity Poise (P) | Temperature at Minimum Viscosity (° C.) | G2c | PES WT % | TACTIX 556 |
|---|---|---|---|---|---|
| Example 1 | 61.34 | 137.0 | 10.22 | 11.5 | 10.0 |
| Example 2 | 66.60 | 130.8 | 13.16 | 11.5 | 14.1 |
| Example 3 | 64.8 | 136.4 | 10.47 | 11.5 | 17.0 |
| Example 4 | 70.6 | 136.2 | 9.15 | 11.5 | 17.0 |
| Example 5 | 56.3 | 134.5 | 9.50 | 11.5 | 10.0 |
| Example 6 | 34.4 | 124.0 | 9.31 | 8.0 | 14.75 |
| Example 7 | 32.55 | 124.1 | 7.30 | 8.0 | 10.0 |
| Comp. Ex. 1 | — | — | 4.68 | 11.5 | 10.0 |
| Comp. Ex. 2 | 85.5 | 130.7 | 9.97 | 11.5 | 10.0 |
| Comp. Ex. 3 | 55.9 | 136.4 | 7.12 | 11.5 | 14.1 |
| Comp. Ex. 4 | 41.23 | 118.9 | 5.13 | 8.0 | 10.0 |
| Comp. Ex. 5 | 30.1 | 122.3 | 4.29 | 8.0 | 5.0 |
| Comp. Ex. 6 | 57.1 | 116.3 | 8.36 | 8.0 | 14.75 |
| Comp. Ex. 7 | 47.8 | 116.1 | 2.64 | 8.0 | 5.0 |

Examples 1-5 are exemplary of resins that have a minimum viscosity which falls within the above mentioned high viscosity range. The resin formulation of Example 1 is preferred because it provides an unexpectedly high G2c of over 10 when using only 10.0 weight percent TACTIX 556 resin in combination with 9.0 weight percent TR90 polyamide particles and 3.0 weight percent P84 polyimide particles. Examples 3 and 4, which use 17.0 weight percent TACTIX 556 resin in combination with 6.0 weight percent TR90 polyanmide particles and 6.0 weight percent P84 polyimide particles, also unexpectedly achieve rather high G2c values while keeping the minimum viscosity within the desired high viscosity range.

The resin formulation of Example 2 is particularly preferred because it provides an increase of G2c up to 13.16 when 14.10 weight percent TACTIX 556 resin is used in combination with 9.0 weight percent TR90 polyamide particles and 3.0 weight percent P84 polyimide particles. Such a high G2c value (13.16) is particularly unexpected.

The high values for G2c that are obtained when TACTIX 556 resin is combined with TR90 polyanmide particles and P84 polyimide particles, as set forth above, is unexpected because Comparative Example 1 shows that the use of P84 polyamide particles alone (C1) provides a relatively low G2c of only 4.68. Comparative Example 2 shows that the use of TR90 polyamide particles alone (C2) provides a much higher G2c of 9.97. It is unexpected that combinations of P84 polyimide particles and TR90 polyamide particles are capable of providing higher G2c values than can be achieved using either type of particle alone.

In view of Comparative Examples 1 and 2, Comparative Example 3 shows an expected decrease in G2c (7.12) when 9.0 weight percent P84 polyimide particles are combined with 3.0 weight percent TR90 polyamide particles. In view of Comparative Examples 1-3, it is unexpected that adding any amount of P84 polyimide particles to a thermoplastic particle component made up of TR90 polyamide particles would synergistically increase the G2c values to at least 10 as shown in Examples 1-3. It is particularly unexpected that a G2c of 13.6 could be achieved when the amount of TACTIX 556 resin is increased from 10.0 to 14.1 weight percent as shown in Examples 1 and 2.

The high G2c values that are obtained with the prepreg resin formulations according to Examples 1-5 is accomplished while keeping the minimum viscosity of the resins at between 25 and 75 Poise. As shown in Comparative Example 2, the use of TR90 polyamide particles alone does provide a relatively high G2c of 9.97. However, the minimum viscosity is 85.5 Poise, which is above the desired high viscosity range of 55-75 Poise.

Examples 6-7 are exemplary of prepreg resins in accordance with the present invention that have a minimum viscosity which falls within the above mentioned low viscosity range. The lower viscosity levels provided by using lower amounts (7-9 wt %) of PES (See Example 6-7 and Comparative Examples 4-7) also results in a decrease in the G2c levels of the cured laminates. Even so, the resin formulation of Example 6-7 provide an unexpectedly high G2c. A comparison of Example 6 to Comparative Example 6 (14.75 wt % TACTIX 556 resin) shows that the G2c is synergistically increased from 8.36 to 9.31 when the thermoplastic particle component is changed from 12.0 wt % TR90 polyamide particles to a mixture of 9.0 wt % TR90 polyamide particles and 3.0 wt % P84 polyimide particles. In addition, a comparison of Example 7 to Comparative Example 4 (10.0 wt % TACTIX 556 resin) shows that the G2c is synergistically increased from 5.13 to 7.30 when the thermoplastic particle component is changed from 12.0 wt % TR90 polyamide particles to a mixture of 9.0 wt % TR90 polyamide particles and 3.0 wt % P84 polyimide particles.

The observed synergistic effect provided by the addition of polyimide particles to TR90 polyamide particles is not expected to occur unless the thermoplastic particle component contains at least 15 weight percent polyimide particles, based on the total weight of the thermoplastic component, with the remainder of the thermoplastic particle component being TR90 polyamide particles. The synergistic effect is expected to end when the thermoplastic particle component contains more than 70 weight percent polyimide particles, based on the total weight of the thermoplastic component, with the remainder of the thermoplastic particle component being TR90 polyamide particles. The maximum synergistic effect is provided when the thermoplastic particle component contains from 20 to 30 weight percent polyimide particles, based on the total weight of the thermoplastic component, with the remainder of the thermoplastic particle component being TR90 polyamide particles.

The inclusion of TACTIX 556 resin in the epoxy resin component provides a substantial increase in the G2c fracture resistance. Examples 6 and 7 show that the G2c goes from 9.31 to 7.30 when the amount of TACTIX 556 resin is reduced from 14.75 to 10.0 weight percent. Comparative Example 5 shows that the G2c drops down to a low value 4.29 when the amount of TACTIX 556 resin is reduced to 5.0 weight percent. Comparative Examples 4 and 6-7 show that a similar drop in G2c occurs when the amount of TACTIX 556 resin is reduced in comparative resins that contain only TR90 polyamide particles as the thermoplastic particle component. Accordingly it is preferred that the amount of hydrocarbon epoxy novolac resin present in the prepreg resin formulations of the present invention be at least 8 weight percent, based on the total weight of the resin.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A pre-impregnated composite material comprising:
   (A) reinforcing fibers comprising carbon fibers; and
   (B) an uncured resin matrix comprising an uncured resin that comprises:
      (a) an epoxy resin component comprising from 9 to 18 weight percent hydrocarbon epoxy novolac resin, based on the total weight of the uncured resin, from 35 to 45 weight percent of a trifunctional epoxy resin and a tetrafunctional epoxy resin, based on the total weight of the uncured resin, wherein the weight ratio between the trifunctional epoxy resin and the tetrafunctional epoxy resin is from 1.0:1.5 to 1.5:1.0;
      (b) from 9 to 15 weight percent of a thermoplastic particle component, based on the total weight of the uncured resin, said thermoplastic particle component comprising a mixture of polyimide particles and polyamide particles, said polyamide particles comprising a polyamide which is the polymeric condensation product of 1,10-decane dicarboxylic acid and an amine component having the formula

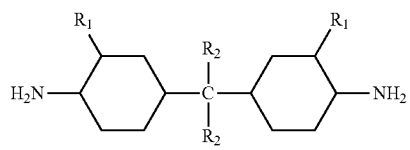

where both $R_2$ are hydrogen and both $R_1$ are methyl and wherein the weight ratio between the polyamide particles and polyimide particles ranges from 3.5:1.0 to 1.0:1.0;
      (d) from 7 to 14 weight percent of a thermoplastic toughening agent, based on the total weight of the uncured resin, said thermoplastic toughening agent comprising polyethersulfone; and
      (e) from 20 to 30 weight percent of a curing agent, based on the total weight of the uncured resin, said curing agent comprising 3, 3'-diaminodiphenylsulfone and/or 4, 4'-diaminodiphenylsulfone.

2. A pre-impregnated composite material according to claim 1 wherein said trifunctional epoxy is a triglycidyl ether of para aminophenol.

3. A pre-impregnated composite material according to claim 2 wherein said tetrafunctional epoxy is a tetrafunctional para-glycidyl amine.

4. A pre-impregnated composite material according to claim 3 wherein said curing agent is 3, 3'-diaminodiphenylsulfone.

5. A pre-impregnated composite material according to claim 1 wherein the amount of said hydrocarbon epoxy novolac resin present in said uncured resin matrix is from 13 to 15 weight percent, based on the total weight of said uncured resin and the weight ratio between the polyamide particles and the polyimide particles is from 3.2:1.0 to 2.8:1.0.

6. A pre-impregnated composite material according to claim 5 wherein the minimum viscosity of said uncured resin matrix is from 25 to 75 Poise.

7. A pre-impregnated composite material according to claim 5 wherein the amount of said thermoplastic toughening agent present in said uncured resin matrix is from 10 to 13 weight percent, based on the total weight of said uncured resin, and said minimum viscosity is from 55 to 75 Poise.

8. A cured laminate comprising a plurality of layers comprising said pre-impregnated composite material according to claim 7 wherein said pre-impregnated composite material has be cured to form said cured laminate and wherein the G2c measurement of interlaminar fracture toughness of said cured laminate, as measured at room temperature according to BSS7320, is at least 10.

9. A primary aircraft structure or part comprising a cured laminate according to claim 8.

10. A pre-impregnated composite material according to claim 5 wherein the amount of said thermoplastic toughening agent present in said uncured resin matrix is from 7 to 9 weight percent, based on the total weight of said uncured resin, and said minimum viscosity is from 25 to 45 Poise.

11. A cured laminate comprising a plurality of layers comprising said pre-impregnated composite material according to claim 1 wherein said pre-impregnated composite material has been cured to form said cured laminate and wherein the G2c measurement of interlaminar fracture toughness of said cured laminate, as measured at room temperature according to BSS7320, is at least 10.

12. A primary aircraft structure or part comprising a cured laminate according to claim 11.

13. A method for making a pre-impregnated composite material comprising the steps of:
(A) providing reinforcing fibers comprising carbon fibers;
(B) providing an uncured resin matrix comprising an uncured resin that comprises:
  (a) an epoxy resin component comprising from 9 to 18 weight percent hydrocarbon epoxy novolac resin, based on the total weight of the uncured resin, from 35 to 45 weight percent of a trifunctional epoxy resin and a tetrafunctional epoxy resin, based on the total weight of the uncured resin, wherein the weight ratio between the bifunctional epoxy resin and the tetrafunctional epoxy resin is from 1.0:1.5 to 1.5:1.0;
  (b) from 9 to 15 weight percent of a thermoplastic particle component, based on the total weight of the uncured resin, said thermoplastic particle component comprising a mixture of polyimide particles and polyamide particles, said polyamide particles comprising a polyamide which is the polymeric condensation product of 1,10-decane dicarboxylic acid and an amine component having the formula

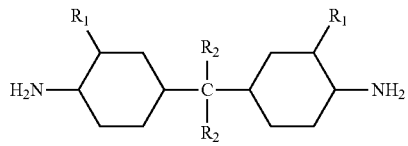

where both $R_2$ are hydrogen and both $R_1$ are methyl and wherein the weight ratio between the polyamide particles and polyimide particles ranges from 3.5:1.0 to 1.0:1.0;
  (d) from 7 to 14 weight percent of a thermoplastic toughening agent, based on the total weight of the uncured resin, said thermoplastic toughening agent comprising polyethersulfone; and
  (e) from 20 to 30 weight percent of a curing agent, based on the total weight of the uncured resin, said curing agent comprising 3, 3'-diaminodiphenylsulfone and/or 4, 4'-diaminodiphenylsulfone; and
(C) combining said reinforcing fibers with said uncured resin matrix.

14. A method for making a pre-impregnated composite material according to claim 13 wherein the viscosity of said uncured resin matrix is from 55 to 75 Poise.

15. A method for making a pre-impregnated composite material according to claim 14 wherein the amount of said hydrocarbon epoxy novolac resin present in said uncured resin matrix is from 13 to 15 weight percent, based on the total weight of said uncured resin and the weight ratio between the polyamide particles and the polyimide particles is from 3.2:1.0 to 2.8:1.0.

16. A method for making a pre-impregnated composite material according to claim 15 Which includes the additional steps of forming said pre-impregnated material into an uncured laminate structure and curing said laminate structure to form a cured laminate wherein the G2c measurement of interlaminar fracture toughness of said cured laminate, as measured at room temperature according to BSS7320, is at least 10.

17. A composite part made according to the method of claim 16.

18. A method for making a pre-impregnated composite material according to claim 13 wherein the minimum viscosity of said uncured resin matrix is from 25 to 45 Poise.

* * * * *